(12) United States Patent
Chow et al.

(10) Patent No.: US 8,302,906 B2
(45) Date of Patent: Nov. 6, 2012

(54) AIRCRAFT NOISE REDUCTION APPARATUS

(75) Inventors: Leung Choi Chow, Bristol (GB);
Christopher Neil Wood, Bristol (GB);
Philip Campbell, Bristol (GB)

(73) Assignee: Airbus Operations Limited, Bristol (GB)

( * ) Notice: Subject to any disclaimer, the term of this patent is extended or adjusted under 35 U.S.C. 154(b) by 997 days.

(21) Appl. No.: 12/153,493

(22) Filed: May 20, 2008

(65) Prior Publication Data

US 2009/0321559 A1 Dec. 31, 2009

(30) Foreign Application Priority Data

Jun. 8, 2007 (GB) .................................. 0710997.8

(51) Int. Cl.
*B64C 25/10* (2006.01)
(52) U.S. Cl. ............. 244/102 A; 244/102 R; 244/103 W
(58) Field of Classification Search ............... 244/100 R, 244/102 R, 102 A, 102 SS, 103 R, 103 W
See application file for complete search history.

(56) References Cited

U.S. PATENT DOCUMENTS

| 2,406,710 | A | * | 8/1946 | Ramey et al. | 244/102 R |
|---|---|---|---|---|---|
| 2,548,832 | A | * | 4/1951 | Tydon | 244/101 |
| 2,747,817 | A | * | 5/1956 | Saulnier | 244/50 |
| 4,408,736 | A | * | 10/1983 | Kirschbaum et al. | 244/100 R |
| 6,575,405 | B2 | * | 6/2003 | Bryant et al. | 244/102 SL |
| 6,619,587 | B1 | * | 9/2003 | Chow et al. | 244/100 R |
| 7,458,542 | B2 | * | 12/2008 | Chow et al. | 244/102 R |
| 7,484,688 | B2 | * | 2/2009 | Chow et al. | 244/100 R |
| 7,651,053 | B2 | * | 1/2010 | Fort | 244/129.4 |
| 2003/0102406 | A1 | * | 6/2003 | Chow et al. | 244/100 R |
| 2006/0032981 | A1 | * | 2/2006 | Fort | 244/129.4 |
| 2006/0060707 | A1 | * | 3/2006 | Chow et al. | 244/129.4 |
| 2006/0102775 | A1 | * | 5/2006 | Chow et al. | 244/1 N |
| 2007/0108344 | A1 | * | 5/2007 | Wood | 244/102 R |
| 2008/0142634 | A1 | * | 6/2008 | Moe et al. | 244/1 N |
| 2009/0008501 | A1 | * | 1/2009 | Chow et al. | 244/100 R |
| 2009/0078821 | A1 | * | 3/2009 | Chow et al. | 244/1 N |

FOREIGN PATENT DOCUMENTS

GB 557444 2/1942

* cited by examiner

*Primary Examiner* — Philip J Bonzell
(74) *Attorney, Agent, or Firm* — Nixon & Vanderhye P.C.

(57) ABSTRACT

The invention relates to aircraft noise reduction apparatus, in particular, but not exclusively, to noise reduction apparatus on an aircraft landing gear. The aircraft noise reduction apparatus comprises a noise reduction attachment for a landing gear of an aircraft. The noise reduction apparatus is movable between a first position in which it deflects air away from a noise inducing component of the landing gear and a second position in which it allows access to the noise inducing component. The movement of the noise reduction attachment between the first and second positions is actuated by a part of the landing gear.

17 Claims, 4 Drawing Sheets

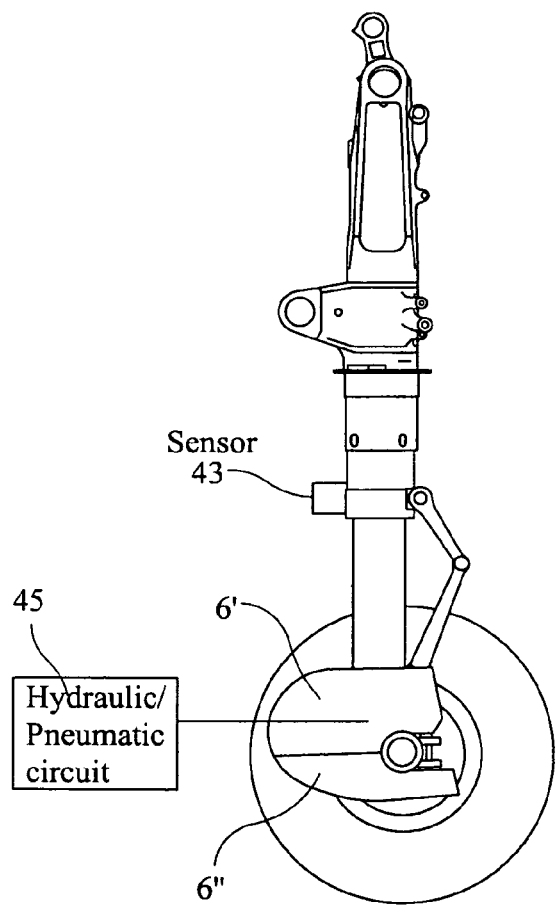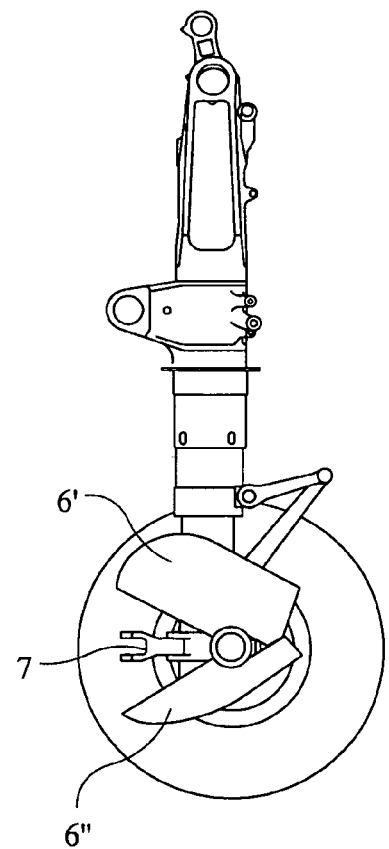
Fig. 2A
Fig. 2B

AIRCRAFT NOISE REDUCTION APPARATUS

This application claims priority to Great Britain Application No. 0710997.8 filed 8 Jun. 2007, the entire contents of which are hereby incorporated by reference.

BACKGROUND OF THE INVENTION

The invention relates to aircraft noise reduction apparatus, in particular but not exclusively, to aircraft noise reduction apparatus on an aircraft landing gear.

It is increasingly important to reduce the noise created by aircraft when landing or taking off from an airport. In particular, when an aircraft is landing, developments in aircraft technology mean the aircraft engine noise has been significantly reduced. The dominant noise created by some aircraft when landing, as perceived at ground level, is starting to become the airframe noise. In order to reduce airframe noise the use of noise reduction apparatus, or fairings, is known. For example, U.S. Pat. No. 6,619,587 discloses a fairing for an aircraft landing gear, the fairing placed to deflect air away from noise inducing components of the landing gear.

However, if using a fairing as disclosed in U.S. Pat. No. 6,619,587 it may become necessary for the ground crew at an airport to access the noise inducing components screened by the noise reduction apparatus, for example a tow bar on a nose landing gear. A possible solution to this access problem includes the provision of bolts or other similar fixing mechanisms which enable the fairings to be detached or moved out of the way by the ground crew once the aircraft has landed. However, this increases the time it takes for a ground crew to deal with an aircraft and introduces the risk that the fairing is not properly secured to the aircraft prior to the aircraft taking off.

Embodiments of the present invention seek to mitigate or overcome one or more of the above-identified disadvantages.

SUMMARY OF THE INVENTION

The invention provides aircraft noise reduction apparatus comprising a noise reduction attachment for a landing gear of an aircraft, wherein the noise reduction attachment is movable between a first position in which it deflects air away from a noise inducing component of the landing gear, and a second position in which it allows access to the noise inducing component of the landing gear, wherein the movement of the noise reduction attachment between the first position and second position is actuated by a part of the landing gear.

Preferably the noise reduction apparatus includes attachments suitable for fixing it to the landing gear. The apparatus may be arranged such that when the landing gear is unloaded the noise reduction attachment is in the first position. The landing gear is unloaded when the aircraft is in the air and the landing gear is fully extended. This position may also be known as the "weight off wheels" position. The apparatus may be arranged such that when the landing gear is loaded the noise reduction attachment is in the second position. The landing gear is in the loaded position when the aircraft is on the ground and the landing gear is compressed by the weight of the aircraft. This position may also be known as the "weight on wheels" position. The movement of the noise reduction attachment may be dependent on the load on the landing gear. Therefore, in this embodiment of the invention, when the aircraft is landing or has left the ground when taking off, the noise reduction attachment is in the first position and deflects air away from the noise inducing component of the landing gear. When the aircraft is on the ground, the noise reduction attachment apparatus is in the second position and allows the ground crew access to the noise inducing component without them having to undertake any additional work.

The noise reducing attachment may comprise a first fairing part and a second fairing part so arranged that in the first position the first and second fairing parts act together as a fairing, whereas in the second position the second fairing part is moved to a position which facilitates access to the noise inducing element. The first fairing part may include an aperture to facilitate such access, the aperture being screened by the second fairing part when in the first position.

The invention also provides a method of reducing aircraft noise, wherein the method comprises the steps of: providing an aircraft landing gear with a noise reducing fairing associated with a noise inducing component; and a part of the landing gear moving the noise reducing attachment between a first, noise reducing, position and a second, access, position.

For example, when the noise reduction fairing is in the noise reducing position the landing gear may be unloaded and when the landing gear is in the loaded position the noise reducing fairing may be in the access position.

DESCRIPTION OF THE DRAWINGS

Embodiments of the invention will now be described, by way of example only, with reference to the accompanying drawings of which:

FIG. 2A shows a side view of the first embodiment of the invention in the unloaded position with a tyre/wheel removed for clarity;

FIG. 2B shows a side view of the first embodiment of the invention in the loaded position with a tyre/wheel removed for clarity;

DETAILED DESCRIPTION

Figures 1A, 1B:
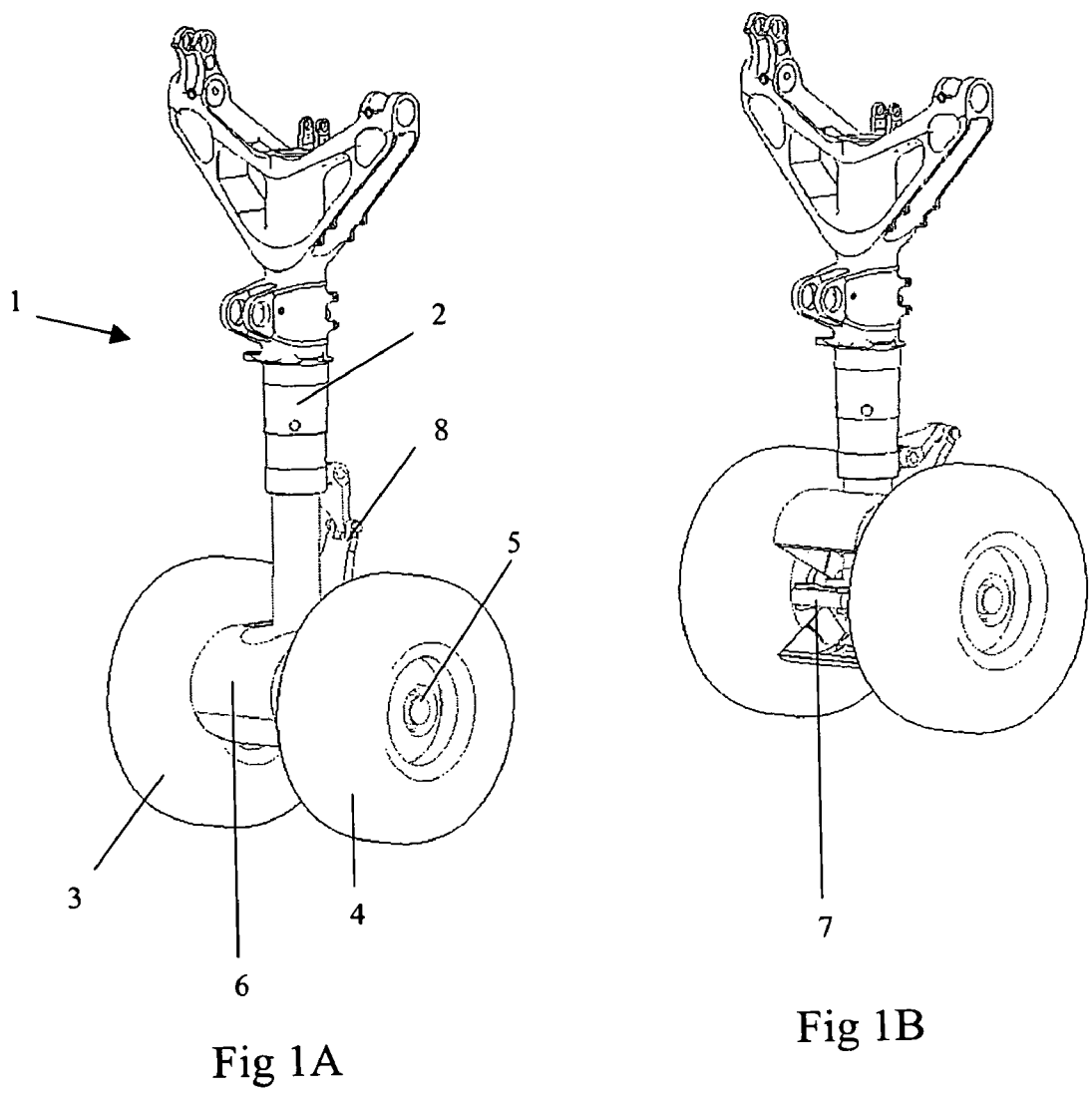
FIG. 1A shows a first embodiment of the invention, the landing gear in the unloaded position.
FIG. 1B shows the first embodiment of the invention, the landing gear in the loaded position.

FIGS. 1A and 1B show a nose landing gear 1 of an aircraft, comprising a main telescopic leg 2, wheels 3, 4, an axle 5, a noise reducing attachment 6, a tow bar attachment 7 and an actuating apparatus including a torgue link 8. The torque link 8 is attached to the top section of the main telescopic leg 2 and the lower part of the landing gear.

In FIG. 1A the landing gear 1 is unloaded and the main telescopic leg 2 is in an extended position. This means that the aircraft to which the landing gear 1 belongs is in the air. The torque link 8 forms part of a hydraulic circuit which is arranged such that when the landing gear 1 is in the unloaded position the noise reducing attachment 6 is in a first position in which it deflects air away from the tow bar 7.

In FIG. 1B the landing gear 1 is loaded and the main telescopic leg 2 is in a compressed position. This means that the aircraft to which the landing gear belongs is on the ground. The torque link 8 has also been compressed by the movement of the top section of the main telescopic leg 2 in relation to the noise reducing attachment 6. The compression of the torque link 8 activates the hydraulic circuit which actuates the noise reducing attachment 6 from the first position to a second position, in which the noise reducing attachment 6 allows access to the tow bar attachment 7.

In this particular embodiment the noise reducing attachment 6 comprises a top part 6' and a bottom part 6" and the movement between the first and second position is an action similar to the opening and closing of a set of jaws. FIG. 2A shows a side view of the landing gear 1 in the unloaded position with one wheel/tyre removed for clarity. The top part 6' and the bottom part 6" of the noise reducing attachment 6 are in contact with each other, and surround the tow bar attachment 7. They act to deflect air away from the tow bar attachment 7 and reduce the noise created by the landing gear 1. FIG. 2B shows a side view of the landing gear 1 in the loaded position with a wheel/tyre removed for clarity. The torque link 8 has been compressed and the noise reducing attachment is in the second position, with the top part 6' and bottom part 6" separated such that they allow access to the tow bar attachment 7. In an alternative embodiment, the torque link 8 may form part of a pneumatic circuit which actuates the noise reducing attachment 6 between the first and second positions. Alternatively, the torque link may play no part in the actuation of the noise reducing attachment 6 between the first and second positions, the noise reducing attachment 6 being actuated by different apparatus. In further alternative embodiments the noise reducing apparatus may be of single piece construction and hinge from the first position to the second position. The movement is preferably in the vertical direction due to spatial considerations but may be in the horizontal direction.

In an alternative embodiment, the noise reducing apparatus may include at least one part which moves around a hinge to provide access to the tow bar. The noise reducing apparatus may include an aperture which provides access to the tow bar, the aperture being blocked and unblocked by a part of the landing gear. The noise reducing apparatus may be in the form of an aircraft fairing. The aircraft fairing may be designed to produce a smooth outline and reduce drag.

When an aircraft including the landing gear 1 is landing the aircraft landing gear 1 is deployed in the extended position. As can be seen, the noise reducing attachment 6 is in the first position in which it deflects air from the tow bar attachment 7. When the aircraft lands the landing gear 1 becomes compressed due to the weight of the aircraft. This actuates the noise reducing attachment 6 into the second position in which it allows access to the tow bar attachment 7. The ground crew may then attach any towing equipment required and manoeuvre the aircraft on the ground. When the aircraft takes off, the landing gear becomes unloaded and extends. This actuates the noise reducing attachment 6 from the second position to the first position.

Figures 3A, 3B:
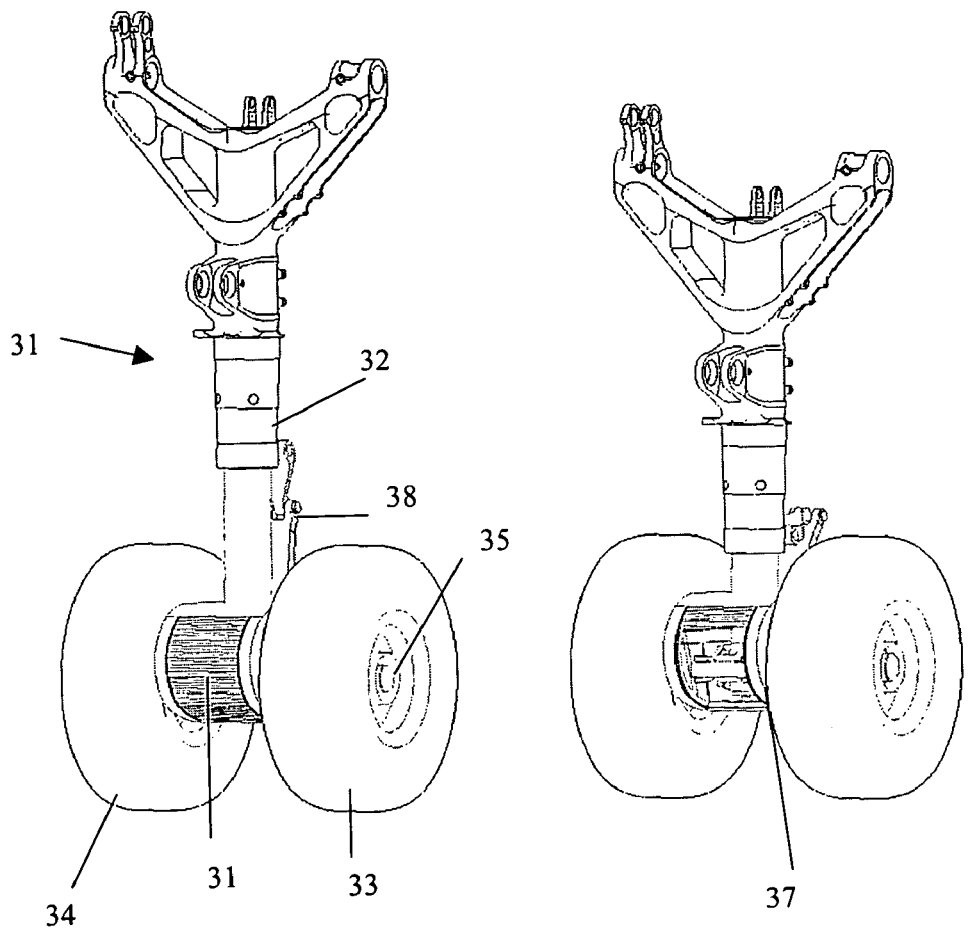
FIG. 3A shows a second embodiment of the invention, the landing gear in the unloaded position.
FIG. 3B shows the second embodiment of the invention, the landing gear in the loaded position.

FIGS. 3A and 3B show a nose landing gear 31, comprising a main telescopic leg 32, wheels 33, 34, an axle 35, a noise reducing attachment 36, a tow bar attachment 37 and a torque link 38. The torque link 38 is attached to the top section of the main telescopic leg 32 and the noise reducing attachment 36.

Figure 4A:
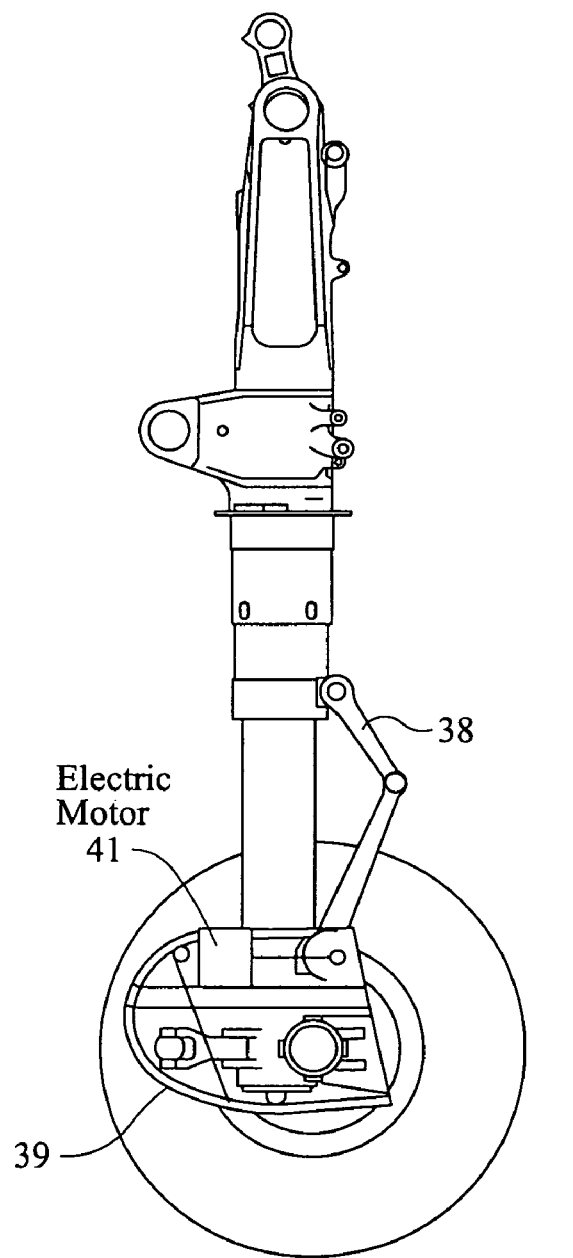
FIG. 4A shows a side view of the second embodiment of the invention in the unloaded position with a tyre/wheel removed for clarity.
Figure 4B:
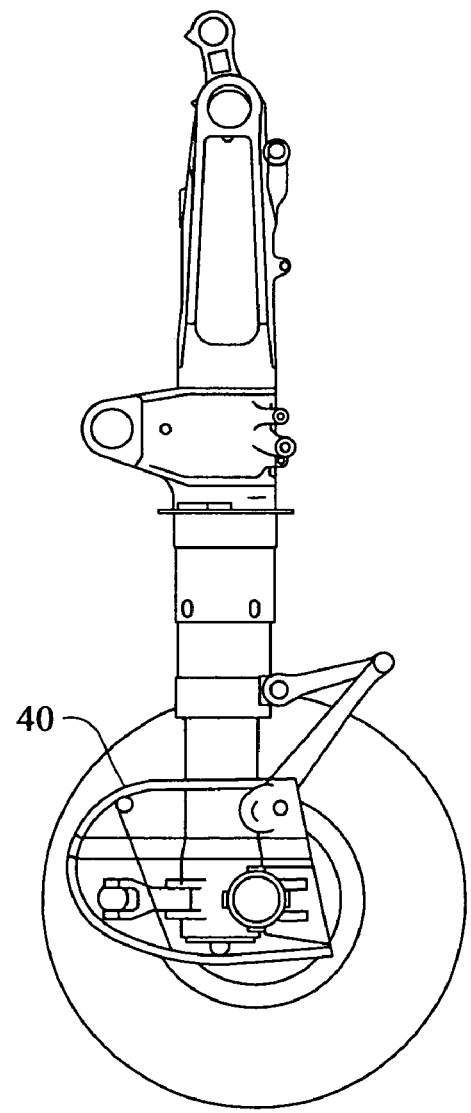
FIG. 4B shows a side view of the second embodiment of the invention in the loaded position with a tyre/wheel removed for clarity.

FIGS. 4A and 4B show a side view of the second embodiment of the invention, with a wheel/tyre removed for clarity, the landing gear in the unloaded and loaded position respectively.

This second embodiment works in a similar way to that described for the first embodiment except that the noise reducing attachment 36 includes a roller door 39 which runs on rails within in the noise reducing attachment 36. The roller door is movable between a first position, in which it is unrolled and directs air away from the tow bar 37, and a second position, in which it is rolled up and allows access to the tow bar 37. The torque link 38 forms part of a hydraulic circuit which drives a roller 40 to roll the door up when the landing gear is in the loaded position. When the landing gear 31 is in the unloaded position the roller 40 unrolls the roller door 39. In an alternative embodiment the torque link 38 may form part of a pneumatic circuit 45. Alternatively, the torque link may play no part in the actuation of the noise reducing attachment 36 between the first and second positions, the noise reducing attachment 36 being actuated by different apparatus. Alternatively, the actuating apparatus may include an electric motor 41. In a further alternative embodiment the actuating apparatus may include a weight-on-wheels sensor 43, which detects whether the landing gear 31 is in the unloaded or loaded position. The sensor may be connected to the electric motor which drives the noise reducing attachment between the first and second position. Both the sensor and the motor may be powered by electrical lines coming from the usual landing gear power loom. Alternatively the sensor may be a speed sensor, which can distinguish between the speeds at which the aircraft flies, and the speeds at which it manoeuvres on the ground.

It will of course be appreciated that features described in relation to one embodiment of the present invention may be incorporated into other embodiments of the present invention.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The invention has been described in relation to a nose landing gear, however, the invention is equally applicable to main landing gear. In a further embodiment, the noise reducing attachment may be actuated between the first and second position by a mechanical linkage. The invention is applicable to both fixed landing gear and movable landing gear, the movable landing gear being movable between a stowed and deployed position.

Certain embodiments of present invention may be of benefit in relation to larger aircraft. The aircraft may be heavier than 50 tonnes dry weight, and may be heavier than 200 tonnes dry weight. The aircraft may be of a size equivalent to an aircraft designed to carry more than 75 passengers, and may be more than 200 passengers.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. Aircraft noise reduction apparatus comprising a noise reduction attachment for a landing gear of an aircraft, wherein the noise reduction attachment is movable between a first position when said landing gear is unloaded and said attachment deflects air away from a noise inducing component of the landing gear, and a second position when said landing gear is loaded and said attachment allows access to the noise inducing component of the landing gear, wherein the movement of the noise reduction attachment between the first position and second position is actuated by a part of the landing gear in response to loading and unloading of the landing gear.

2. Aircraft noise reduction apparatus according to claim 1, wherein the noise inducing component of the landing gear is a tow bar attachment.

3. Aircraft noise reduction apparatus according to claim 1, wherein the noise reduction attachment comprises at least one hinge about which at least a part of the attachment may move.

4. Aircraft noise reduction apparatus according to claim 1, wherein the noise reduction attachment comprises a roller door.

5. Aircraft noise reduction apparatus according to claim 1, including a mechanical linkage for actuating the movement of the noise reducing attachment between the first position and second position.

6. Aircraft noise reduction apparatus according to claim 1, including an electrical motor for actuating movement between the first position and second position.

7. Aircraft noise reduction apparatus according to claim 6, wherein the actuation of the noise reduction attachment between the first position and second position is controlled by a sensor arranged to sense a property of the aircraft landing gear.

8. An aircraft landing gear comprising aircraft noise reduction apparatus as claimed in claim 1.

9. An aircraft landing gear according to claim 8, wherein the aircraft landing gear is a nose landing gear.

10. An aircraft including aircraft noise reduction apparatus according to claim 1.

11. A kit of parts comprising an aircraft noise reduction attachment and actuation apparatus suitable for use in the noise reduction apparatus as claimed in claim 1.

12. A method of reducing aircraft noise, wherein the method comprises the steps of:

providing an aircraft landing gear with a noise reducing attachment associated with a noise inducing component; and moving, in response to movement of a part of the landing gear moving between loaded and unloaded positions, the position of the noise reducing attachment between a first, noise reducing, position when the landing gear is unloaded and a second, access, position when the landing gear is loaded.

13. A method of reducing noise according to claim 12, wherein the noise reducing fairing is moved between the first noise reducing position and a second access position in dependence on a property of the landing gear.

14. A method of reducing noise according to claim 12, wherein the control of the noise reduction fairing includes the step of monitoring a property of the landing gear with a sensor.

15. A method of reducing noise according to claim 12, wherein the control of the noise reduction fairing includes the step of activating a hydraulic or pneumatic circuit associated with the noise reduction fairing.

16. A method of reducing noise according to claim 12, wherein the control of the noise reduction fairing includes the step of activating an electric motor associated with the noise reduction fairing.

17. Aircraft noise reduction apparatus comprising a noise reduction attachment for a landing gear of an aircraft, wherein the noise reduction attachment is movable between a first position when said landing gear is unloaded and said attachment deflects air away from a noise inducing component of the landing gear, and a second position when said landing gear is loaded and said attachment allows access to the noise inducing component of the landing gear, wherein the movement of the noise reduction attachment between the first position and second position is actuated by a mechanical linkage driven by loading or unloading of the landing gear.

* * * * *